Sept. 6, 1932.  L. W. KENNEDY  1,876,423
DIVIDER SUPPORT
Filed June 29, 1931   2 Sheets-Sheet 1
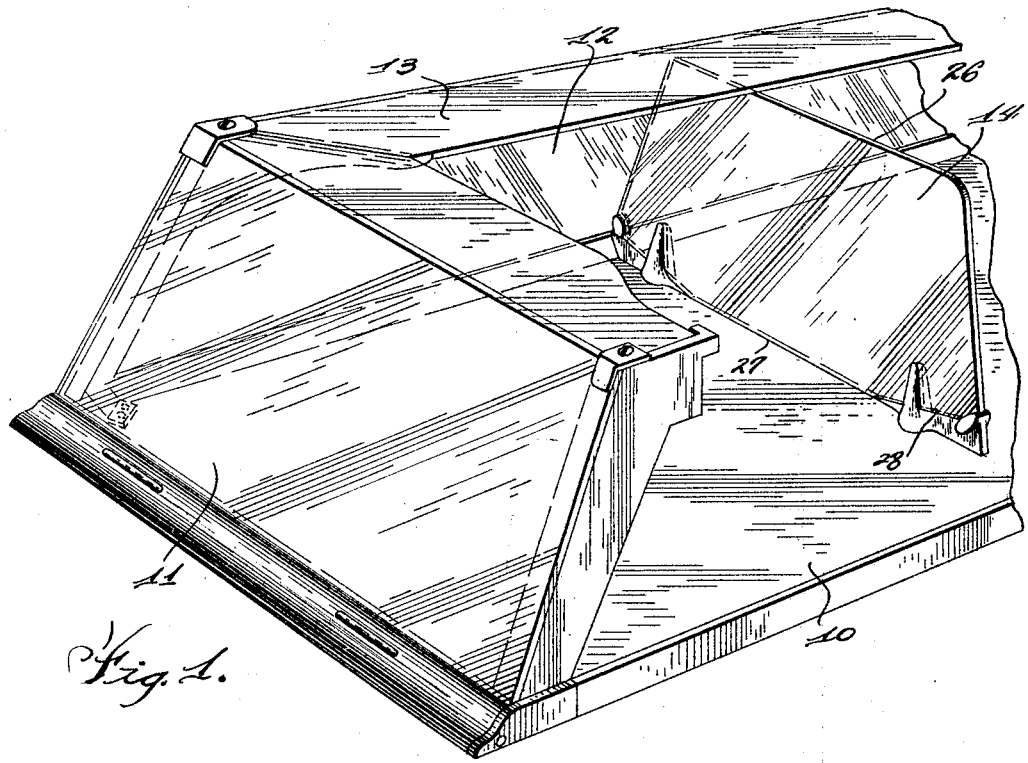
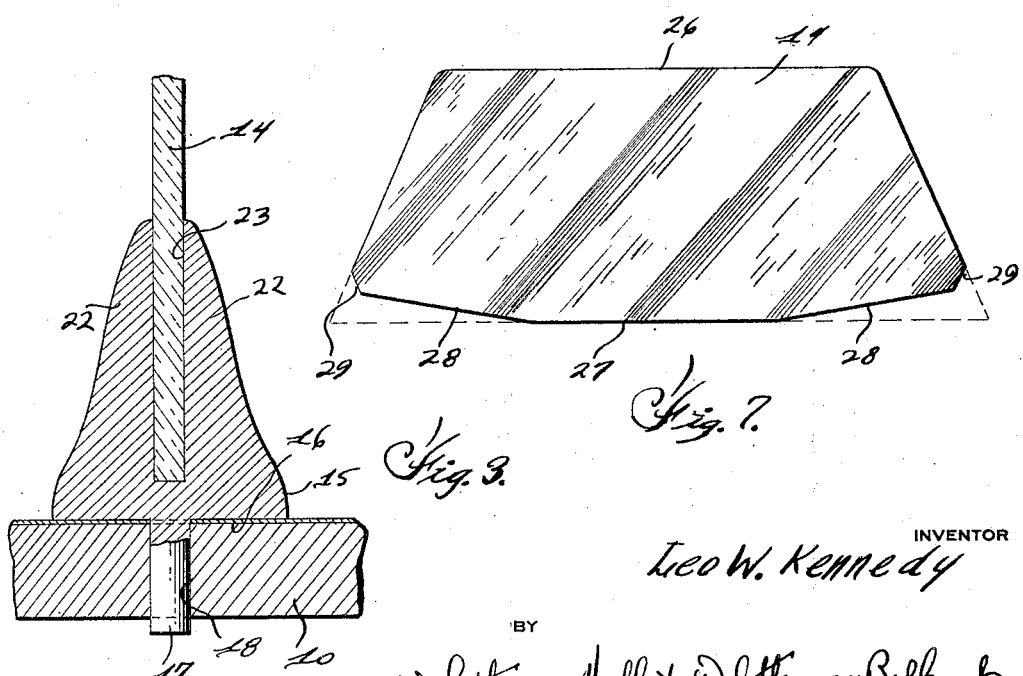
INVENTOR
Leo W. Kennedy
BY
ATTORNEYS Sept. 6, 1932.  L. W. KENNEDY  1,876,423
DIVIDER SUPPORT
Filed June 29, 1931  2 Sheets-Sheet 2
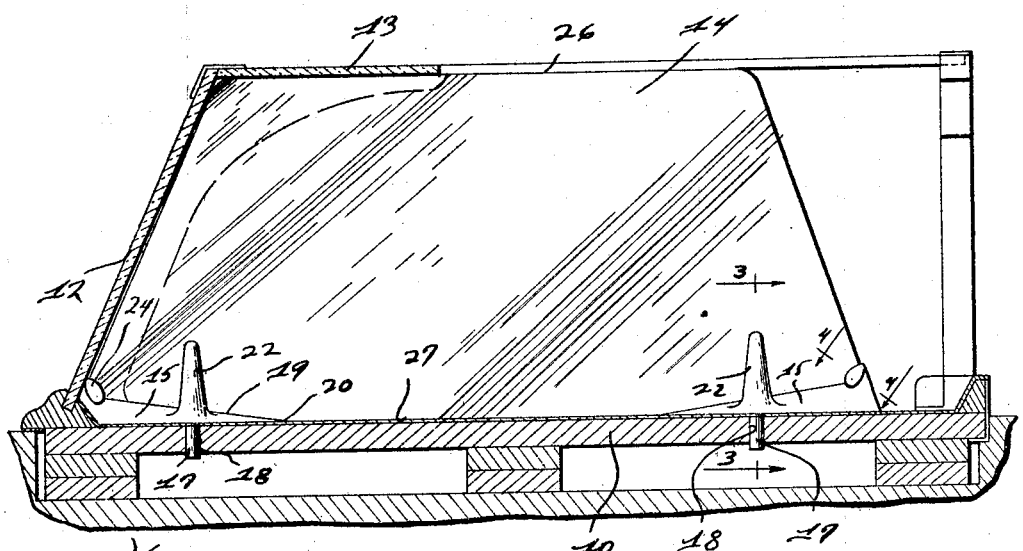
Fig. 2.
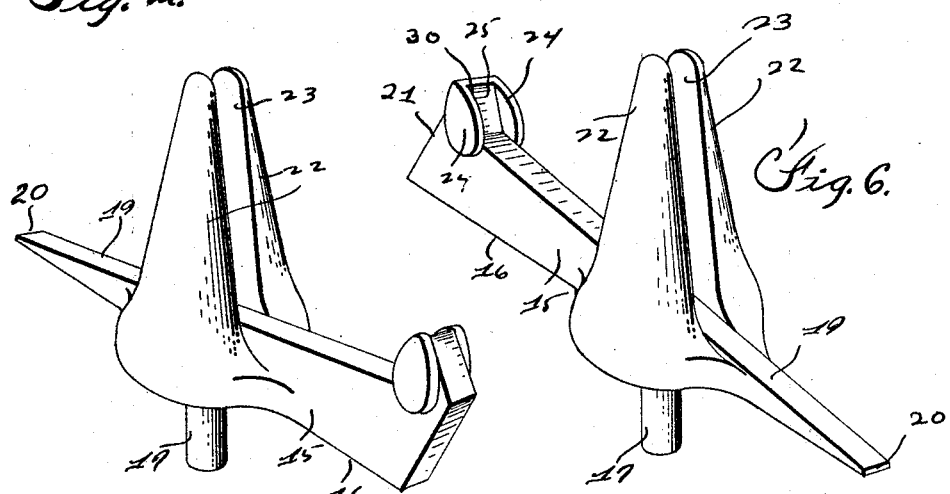
Fig. 6.
Fig. 5.
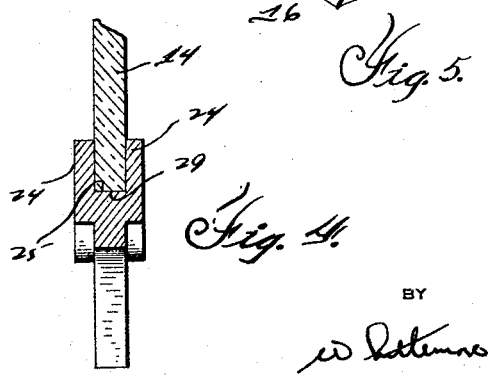
Fig. 4.
INVENTOR
Leo W. Kennedy
BY
ATTORNEYS Patented Sept. 6, 1932

1,876,423

UNITED STATES PATENT OFFICE

LEO W. KENNEDY, OF DETROIT, MICHIGAN

DIVIDER SUPPORT

Application filed June 29, 1931. Serial No. 547,719.

This invention relates to an improved construction of partition or divider for show cases and has as its objects to simplify, render more efficient and improve generally constructions of this character.

One of the primary objects of this invention is to provide a divider or partition wherein it is unnecessary to notch the lower edge of the glass partition as has heretofore been generally customary.

In the majority of the commercially practical prior art structures of this type, it has been customary to provide partitions or divider supports secured to the bottom of the show case and to notch the lower edge of the glass where it engages each of these supports in order to accommodate the glass partition to the supports and to permit the remaining portion of the lower edge of the partition to engage the bottom of the show case.

The operation of notching the glass partitions is not only costly but difficult and as a consequence replacements, when necessary, cannot be readily produced unless the proper equipment is available. In fact, in practice it is usually necessary to obtain new partitions for replacements from the factory.

Another disadvantage of this type of prior art structures is that the glass partition is weakened when notched and the partition is supported at the notched portions which are the weakest portions of the partition.

Moreover, with the old forms of construction the wear occasioned by the engagement of the notched portions of the glass with the supports causes chips of glass to be formed which often mix with the contents of the show case which is not only objectionable, but frequently dangerous if the contents of the case are edible.

In accordance with the present invention the necessity for notching the lower edge of the partitions or dividers is eliminated so that the aforementioned obvious disadvantages of the prior art structures are eliminated.

Furthermore with the majority of the commercially practical prior art structures the glass partitions are not adequately supported at the ends and lateral pressure or jars on the exposed ends of the glass frequently cause a fracture of the same. This is particularly so at the edge of the partition adjacent the open side of the show case where the contents thereof are removed. In addition difficulty has been experienced in preventing longitudinal edgewise movement of the partitions so that it is practically impossible to keep the edges of the dividers in alignment.

In accordance with my invention the glass partitions are supported at four points, two adjacent each end of the partition. The divider supports therefore not only adequately protect the glass partition against fracture caused by lateral pressure at the ends, but provide a metal portion to take the impact of a scoop or the like, employed for instance, in candy cases, for removing the contents from the open side of the case. Moreover, as heretofore pointed out, the construction of the support is such that the glass partitions can be shaped to fit therein merely by inclining the lower edge portion at the ends thereof, notching the lower edge of the glass being unnecessary.

The several objects, advantages and novel details of construction of my invention will be made more apparent as this description proceeds, especially when considered in connection with the accompanying drawings, wherein Figure 1 is a fragmentary perspective view of a show case showing my improved partition or divider associated therewith;

Figure 2 is a transverse sectional elevational view through the show case shown in Figure 1 and illustrating more clearly the partition or divider;

Figure 3 is an enlarged fragmentary vertical sectional view taken substantially on the plane indicated by line 3—3 in Figure 2;

Figure 4 is an enlarged fragmentary sectional elevational view taken substantially on the plane indicated by line 4—4 in Figure 2;

Figure 5 is a perspective view of the front divider or partition support removed;

Figure 6 is a similar view of the rear divider support; and

Figure 7 is an elevational view of the glass partition.

Referring now more particularly to the drawings wherein like reference characters indicate like parts it will be noted that in Figures 1 and 2 there is illustrated a show case having a base or bottom 10, and end light 11, a front light 12, and top lights 13. Obviously, however, the show case itself may be of any desired or preferred construction.

The reference character 14 indicates the partition or divider which, as is customary, is in the form of a sheet or plate of glass. These partitions are adapted to be arranged transversely of the show case to divide the interior thereof into compartments in which different types of merchandise may be displayed and from which the same may be dispensed. In the illustrative embodiment of the invention herein described, the case is more especially designed for displaying and dispensing candy and is provided with an open back from which the contents of the case may be scooped.

The partition or divider supports are shown in perspective view in Figures 5 and 6 and from these figures it will be noted that each support comprises a base portion 15 having a bottom face 16 which is parallel with the bottom 10 of the show case and is adapted to rest and be supported thereon. Any suitable means may be provided for securing the supports in place, one simple and convenient means being a dowel pin 17 adapted to engage a corresponding opening 18 in the show case bottom 10. The upper face 19 of the base is inclined from the narrow or substantially knife-like end 20 to the shoulder end 21. The body 15 is substantially the width of the glass partition or divider 14 and when the divider is in position the body 15 of the support constitutes substantially a continuation of the partition.

Arranged intermediate the ends of the body of the support is a pair of upstanding projections or arm 22 which together form a slot 23 for receiving the lower edge of the partition. These arms 22 extend upwardly a sufficient distance so that adequate lateral support is provided for the partition, the width of the slot 23 being substantially the width of the body portion 15 so that the glass partition is closely embraced by these arms.

Additional lateral support is provided for the glass partition adjacent the shoulder 21 of the base by means of a pair of projections or extensions 24 which together produce a slot 25 for receiving the partition at the extreme end.

As seen most clearly from Figure 7 the upper edge 26 of the divider or partition is usually parallel with the show case bottom 10 as is also the intermediate lower edge portion 27. The bottom edge at the opposite ends thereof is tapered or inclined as at 28 to correspond to the inclined upper faces 19 of the supports. The lower edges at the extreme ends thereof are usually cut off to produce the short angle faces 29 which are received in the slots 25 of the supports.

With the supports in place in the show case as illustrated in Figures 1 and 2, the dividers or partitions may be quickly and easily associated therewith and when in place will be adequately supported against lateral shock or jars particularly at the ends, the majority of which would be occasioned at the ends of the partition adjacent the open side of the show case.

The shoudler 30 of the supports prevent longitudinal edgewise movement of the partitions and maintain them in alignment, and if the contents of the case are dispensed by means of scoops and the like, the shoulder end 21 of the support at the open side of the case takes the majority of the impacts of the scoop and thus protects the edge of the partition.

It has also been found that if the partition becomes broken and must be replaced that any ordinary glass cutter can cut a new partition owing to the fact that it is unnecessary to notch the same.

Obvious modifications will suggest themselves to those skilled in this art and to this end reservation is made to make such changes as may come within the purview of the accompanying claims.

What I claim as my invention is:

1. In a show case, the combination with a glass partition having an unnotched lower edge provided with an upwardly inclined portion, said partition resting upon the floor of the show case with the inclined edge portion spaced therefrom, of a support resting on said floor and having longitudinally spaced partition receiving and supporting portions adapted to embrace the inclined edge of the partition, the edge engaging face of the support being shaped to correspond to the inclined edge of the partition.

2. In a show case, a glass partition, a pair of divider supports secured to the bottom of the show case, each support having a pair of upwardly extending projections intermediate its ends which together form a slot for receiving said partition, each support being substantially wedge-shaped with its wide part located adjacent an end edge of the partition, means at the wide end of each support for securing the partition against lateral and longitudinal edgewise movement, the portions of the bottom edge of the partition which contact with said supports being inclined correspondingly with the upper faces of said supports, for the purpose set forth.

3. In a show case, a glass partition having an unnotched lower edge resting upon the floor of the show case with an end of said edge inclined upwardly away from said floor, a support therefor resting on said floor and filling the space between said floor and the inclined portion of said partition edge, and means on said support for embracing the adjacent edge of said partition to support the same.

In testimony whereof I affix my signature.
              LEO W. KENNEDY.